_(12)_ United States Patent
Boara et al.

(10) Patent No.: US 7,181,862 B2
(45) Date of Patent: Feb. 27, 2007

(54) SOL-GEL PROCESS FOR THE PRODUCTION OF GLASSY ARTICLES

(75) Inventors: Giulio Boara, Crema (IT); Massimo Sparpaglione, S. Donato Milanese (IT); Lorenzo Costa, Sommo (IT)

(73) Assignee: Degussa Novara Technology, S.p.A., Novara (IT)

( * ) Notice: Subject to any disclaimer, the term of this patent is extended or adjusted under 35 U.S.C. 154(b) by 50 days.

(21) Appl. No.: 10/542,191

(22) PCT Filed: Dec. 23, 2003

(86) PCT No.: PCT/EP03/14759

§ 371 (c)(1),
(2), (4) Date: Jul. 14, 2005

(87) PCT Pub. No.: WO2004/063105

PCT Pub. Date: Jul. 29, 2004

(65) Prior Publication Data

US 2006/0059709 A1      Mar. 23, 2006

(30) Foreign Application Priority Data

Jan. 15, 2003   (IT)   .............................. NO03A0001

(51) Int. Cl.
*F26B 3/02* (2006.01)
(52) U.S. Cl. ............................ 34/304; 34/329; 34/362; 34/372; 34/393; 65/17.2; 501/54; 516/85
(58) Field of Classification Search ................. 34/302, 34/304, 329, 362, 372, 393; 65/17.2; 501/54; 516/85
See application file for complete search history.

(56) References Cited

U.S. PATENT DOCUMENTS

| 4,324,576 | A |   | 4/1982  | Matsuyama et al. |
|-----------|---|---|---------|------------------|
| 4,680,048 | A |   | 7/1987  | Motoki et al. |
| 4,681,615 | A |   | 7/1987  | Toki et al. |
| 5,076,980 | A |   | 12/1991 | Nogues et al. |
| 5,096,745 | A | * | 3/1992  | Anderson et al. ........... 427/226 |
| 5,207,814 | A |   | 5/1993  | Cogliati et al. |
| 5,243,769 | A |   | 9/1993  | Wang et al. |
| 5,473,826 | A |   | 12/1995 | Kirkbir et al. |
| 5,948,535 | A | * | 9/1999  | Chiurlo et al. .............. 428/426 |
| 6,479,207 | B1| * | 11/2002 | Mori .......................... 430/138 |
| 2004/0025537 | A1 | * | 2/2004 | Costa et al. .................. 65/17.2 |

FOREIGN PATENT DOCUMENTS

EP   0 586 013 A2   3/1994
WO   WO 02/04370 A1   1/2002

* cited by examiner

*Primary Examiner*—S. Gravini
(74) *Attorney, Agent, or Firm*—Smith, Gambrell & Russell, LLP

(57) ABSTRACT

Glassy articles are prepared by subjecting to hydrolysis and policondensation a solution or suspension of a suitable precursor, mainly comprising a silicon alkoxide, and by drying the obtained gel in a pressure chamber, the gel solvent having been substituted by a non-protic solvent, mainly acetone, under nitrogen flowing, at temperature and pressure conditions lower than the gel solvent critical values. The dried gel is then densified by a thermal treatment.

13 Claims, No Drawings

SOL-GEL PROCESS FOR THE PRODUCTION OF GLASSY ARTICLES

The present invention relates to an improved process for the production of glassy articles comprising: a step for the preparation of the gel of the interesting material through the so called sol-gel technique, a step for drying the obtained gel by a pressure heating in the presence of an inert fluid and under the critical pressure and temperature of the solvent present in the gel pores and a final step of a thermal treatment in order to obtain the glassy article. Of course, the process can be stopped at any step in the case some relevant intermediates are aimed to be drawn, because of other application, such as, for instance, the sol as such, or the very gel before the syntherization.

It is known that the term "sol-gel" relates to and covers a wide field of procedures for the production of dry gels, that, in the case, can be densified to prepare corresponding glassy bodies. The dry gels, as such, can be employed as catalyst carriers, or in the thermal insulation field, while the glasses obtained thereby can find applications in various technological fields, mainly in the optic and the semiconductor fields.

Usually, the glasses are produced by melting mixtures of suitable powders and by subsequently solidifying the melted product. On the contrary, the sol-gel processes use solutions of the precursors of the interesting materials and avoid to pass through melting steps, often out of any possible control.

All sol-gel processes known in the art comprise the following steps:

preparation of a solution, or suspension, of a precursor formed by a compound of the element (M) forming the oxide which is the goal for the preparation of the final glassy article, hydrolysis, acid or base catalyzed, of the precursor, to form M—OH groups, according to the reaction $MX_n + nH_2O \rightarrow M(OH)_n + nHX$ wherein the unknown capital letters have the meaning hereinafter reported. The so obtained mixture, i.e. a solution or a colloidal suspension, is named sol, polycondensation of the M—OH groups according to the reaction $M—OH + M—OH \rightarrow M—O—M + H_2O$ characterized by an increase of the liquid viscosity (gelation) and by the contemporaneous formation of a matrix called gel, gel drying with the formation of a porous monolithic body; drying can be carried out by a controlled solvent evaporation, which produces the so called xerogel, or by a solvent supercritical extraction which produces the so called aerogel: As above said the dried gel can be industrially used as such, or it can be densified by a thermal treatment to prepare a glassy body.

The sol-gel techniques, when aimed to the glass production, warrant advantages on the melting techniques because of a better control of all process parameters and, consequently, because of the final products which are characterized by higher purity.

Sol-gel processes for the production of glassy bodies, mainly silicon oxide based, are disclosed in many patents. For instance, U.S. Pat. No. 4,324,576 and No. 5,076,980 relate to processes wherein the precursors are alkoxydes, particularly tetramethoxyorthosylane (TMOS) and tetraethylorthosilicate (TEOS). Improved processes, aimed to minimize the production costs and to improve the quality of the final product, are described in U.S. Pat. Nos. 4,680,048, 4,681,615 and 5,207,814 or in EP 586,013, wherein there is disclosed also the addition of silica to sol obtained alkoxydes, under pyrogenic or colloidal shape. According to these patents teaching, a peculiar care is given to the gelling step (polycondensation) and, particularly according EP 586,013, to the gel drying that, in a method for the production of optical components and in almost final devices, is carried out at temperature and pressures above the critical values of the solvent within gel.

The final products are quite good: however, the hypercritical drying technology needs apparata built with particular materials and moreover, can be carried out only by high energy consumptions. U.S. Pat. Nos. 5,243,769 and 5,473,826 disclose methods for drying porous gels, obtained via sol-gel processes, under temperatures and pressures lower than the critical values of the gel solvent, which comprise the gel setting, once immersed in a drying solvent, in a pressure chamber and the increase of the temperature thereof: the former, in the presence of an inert gas saturated by the above said solvent vapor, the latter, without such an inert gas, as well as a continuous monitoring of the internal pressure: however, the deviation from the solvent temperature and pressure critical values is low, and all methods comprise the use of a drying solvent in the pressure chamber, in discrete amounts, which forces the consequent use of recovery procedures.

The Applicant has now found, which is the main object of the present invention, that it is possible to achieve a process for the production of glassy articles, without any of the above said drawbacks, which comprises the sol-gel technique to prepare gel, as well as the drying thereof at temperature and pressure conditions lower than the solvent critical values, also with very high deviation therefrom; of course, the processes can be achieved also to prepare and to separate any interesting intermediate, such as sol to be hydrolyzed, or the very gel before the thermal densification. The preparation and the separation of such intermediates are, on turn, appendant objects of the present invention, to which they fully pertain.

It is therefore an object of the present invention a process for the production of glassy articles comprising the following operations:

a) preparation of an aqueous or hydroalcoholic solution, or suspension, of at least of a compound having the formula $X_m—M—(OR)_{n-m}$ wherein M is a cation of an element belonging to the $3^{rd}$, $4^{th}$, or $5^{th}$ Group of the Periodic System, n means the cation valence, X is $R_1$ or $OR_1$, $R_1$ being the same of or different from R, m is zero or an integer number lower than 3, R and $R_1$ are hydrocarbon radical having a carbon atom number up to 12;

b) hydrolysis of the above said compound, either in solution or in suspension, to obtain the so called sol;

c) eventual addition in colloidal suspension of possible $M_2O_n$ d) sol gelling;

e) substitution of the gel pore solvent with a non protic solvent;

f) gel setting in a pressure chamber;

g) inert gas fluxing into the pressure chamber;

h) pressure chamber heating over a programmed time period to achieve predeterminate temperature and pressure values, lower than the relevant critical value of the gel solvent, and evaporation thereof;

i) depressurization of the pressure chamber with vapor discharge;
j) pressure chamber washing by an inert gas;
k) cooling the dried gel and removal thereof from the pressure chamber;
l) dried gel syntherization by heating at a prefixed temperature to form a glassy body without any cracking.

The colloidal solution (sol) of the step a) is prepared by mixing one or more metallic oxide precursors, according to the above mentioned formula, with water, or water/alcohol, in the presence of a catalyst, either acid or base. As above said, M is a cation, n valenced, of an element belonging to Groups 3, 4 or % of the Element Periodic System, particularly Si, Ge, Ti and Al, Si being the preferred one. As to all possible meanings of X, the alkoxide groups are the preferred ones and, with reference thereto, particular interest is in methoxy, ethoxy, propoxy and butoxy groups.

The hydrolysis is carried out also at room temperature, and the same can be performed over a time from 5 minutes to beyond 4 hours, till the formation of hydrated oxides of the cation/s constituting the colloidal solution components. Before gelling, the obtained sol can be added by a colloidal suspension of the oxide of at least one of the present cations. For instance, if use is made of a precursor comprising or constituted by a silicon alkoxide, the above obtained colloidal solution can be added a solution/suspension prepared by mixing water, possible solvent, fumed silica, an acid or a base. The interruption or the completion of the hydrolysis, at any time before the gelling start, produce a time stable sol, that can be separated and stored: the possible removal of such an intermediate also constitutes an object of the present invention.

The sol gelling, according to the step d), is carried out by pouring sol into a mould and by letting the same stay at a temperature lower than 90° C. over a time period from few minutes to some hours.

At the gelling end, the gel is washed, for instance by an organic solvent, and the solvent inside the pores thereof is replaced by a non-protic solvent. Such a non-protic solvent is preferably selected among acetone, dioxane, hydrofuran, acetone being the preferred one.

The gel shape, obtained thereby, with the most possible minimum solvent content, is directly set inside a pressure chamber wherein, after closing, an inert gas is fluxed, mainly nitrogen, at a pressure suitable to achieve, at the pressure chamber temperature lower than the gel solvent critical temperature, a total pressure lower than the solvent critical pressure, from pressure values close to the critical pressure values up to the deviations of about 60% and higher.

There, according to the step h), the pressure chamber temperature is increased according to a predetermined program, in order to let the gel solvent evaporate.

By keeping the programmed temperature, the chamber is depressurizes (step i) to facilitate the removal of gas and vapor, such as an operation being assisted by the following chamber cleaning that is preferably carried out by nitrogen.

After the cleaning end, the pressure chamber is cooled, opened and the dried gel is removed (step k).

The obtained gel, in the shape obtained from the mold used in step g) can, according to an appendant object of the present invention, be separated and employed as such, or subjected to the vetrification procedure according to step l).

Such a procedure comprises to put the dry gel in an oven, to increase the oven temperature beyond 100° C., also up to 900° C., under an atmosphere containing also oxygen, that is used to calcinate the gel. After this treatment, or during the same, gas mixtures can be fed containing chlorine or chlorine precursors, to remove possible hydroxides present in silica and/or to purify aerogel, the oven temperature being between 100° C. and 1250° C.

At last the oven temperature is increased to a value letting the aerogel be densified to reach vetrification, such a temperature, with reference to silica material, being between 900° C. and 1650° C., under an inert gas atmosphere, the gas being helium, oxygen, chlorine, and the like. The duration of any oven treatment can range from tens of minutes to many hours.

The advantages of the process found by the Applicant over those process operating at subcritical conditions are temperature and pressure of operation still lower than those claimed by those Patents (U.S. Pat. No. 5,243,769 and U.S. Pat. No. 5,473,826).

In addition clearly other advantages are to operate withput drying solvent in the pressure chamber in such amount which forces the consequent use of recovery procedures.

All above said and further operative details will appear more clear by reading the following examples, which aim to illustrate the invention without any limitation to the purposes thereof.

EXAMPLE 1

26.1 l of 0.01 N HCl were added, under stirring, to 9.4 l of TEOS. After about 60 minutes of continuous stirring, a transparent solution was obtained. 5 kg of powdery fumed silica were added under strong stirring. The commercial product Aerosil OX-50 was particularly idoneous to be added there accordingly. The mixture was homogenized by a very strong mechanical stirring for about 60 minutes and, then, by ultrasounds for about ten minutes. The treated mixture was subjected to centrifugation and then set in a suitable glass container. This dispersion was added by a 0.01 N ammonia aqueous solution, in such an amount to warrant the time to pour the very dispersion into the gelation vessels. The treated dispersion was poured into many cylindric containers, wherein the gelation occurs, having internal diameters of 24 mm and 80 mm and heights of 500 mm and 1100 mm, respectively.

The cylinders were closed and interconnected with polypropilene pipes with 6 mm diameter. After 24 hours and the gelling completion, a fluid was flowed, through the cylinders and the interconnecting pipes, at a 5 ml/minute rate, which comprised a water/acetone mixture at a composition of 100% water at the very beginning but time ranging till to become anhydrous acetone within 48 hours. The inlet flow of anhydrous acetone is maintained till the water concentration, in the outlet fluid is standingly lower than 0.1%, even if the flowing is stopped over more than 48 hours and then started again.

Two cylinders with 24 mm internal diameter, containig gels treated as above said and named wet gels, were put in an autoclave having 413 l internal volume, together with a vessel with 4 l acetone. Once the autoclave had been sealed and heated up to 80° C., nitrogen was fed till to let the inside total pressure be 48 bar. Then the temperature has been increased up to 225° C., at a 5° C./h rate, to let the autoclave inner gas escape in a controlled way, such to avoid the total pressure becoming higher than 50 bar. The acetone partial pressure and the autoclave fluid temperature continuously were lower than the critical ones so allowing the process to be carried out under non-critical conditions. At 225° C., tha autoclave was depressurized to 1 bar, over 24 hours, and nitrogen washed before being opened and the two samples being removed, such samples being now dry, very porous gels, named aerogels, of cylindrical shape. The aerogels were put in an oven; the oven was closed and the temperature was raised to 800° C. over 24 hours while room air had being flowed, at a 5 l/min rate. After 12 hours more at this temperature and under helium flowing, the temperature was raised to 1390° C. at 10° C./min rate. The temperature is kept at 1390° C. for 10 minutes and then decreased to 800° C., at a 10° C./min rate, when the oven was shut off and cooled to room temperature, still under nitrogen atmosphere.

The resulting samples were two glassy bodies having no crackings and a cylindrical shape.

EXAMPLE 2

Two wet gels, produced according to the preceding example 1, were put in an autoclave having 413 l internal volume, together with a container of 35 l acetone. Once the autoclave has been sealed and heated to 80° C., nitrogen was fed to let the autoclave inner pressure reach 9 bar. Then, at 5° C./h rate, the temperature was increased to 225° C., to let the autoclave inner gas escape in a controlled way such to avoid the total pressure becoming higher than 32 bar.

The autoclave fluid pressure and temperature continuously were lower than the acetone critical ones, i.e. the fluid inside the gel pores, allowing the process to be carried out under non-critical conditions. At 225° C., the autoclave is depressurized to 1 bar pressure, over 24 hours, and nitrogen washed before being opened and the two samples being removed, such samples being now dry, very porous, named aerogels, of cylindrical shape. The aerogels were put in an oven; the oven was closed and the temperature was raised to 800° C. over 24 hours, while bumb air had being flowed, at a 5 l/min rate. After 12 hours more at this temperature and under helium flowing, the temperature was raised to 1390° C. at a 10° C./min rate, still under helium flowing. The temperature was kept at 1390° C. for 10 minutes and then decreased to 800° C., at a 10° C./min rate, when the oven was shut off and cooled to room temperature, under nitrogen atmosphere.

The resulting samples were two glassy bodies having no crackings and a cylindrical shape.

EXAMPLE 3

Two wet gels, produced according to example n.1, were put in an autoclave having 413 l internal volume, together with a container of 4 l acetone. Once the autoclave has been sealed and heated to 80° C., nitrogen was fed to let the autoclave inner pressure reach 47 bar. Then, at 50° C./h rate, the temperature was increased to 250° C., to let the autoclave inner gas escape in a controlled way such to avoid the total pressure becoming higher than 50 bar.

The autoclave acetone pressure continuously was lower than the critical one, allowing the process to be carried out under non-critical conditions. At 225° C., the autoclave is depressurized to 1 bar pressure, over 24 hours, and nitrogen washed before being opened and the two samples being removed, such samples being now dry, very porous, named aerogels, of cylindrical shape. The aerogels were put in an oven; the oven was closed and the temperature was raised to 800° C. over 24 hours, while room air had being flowed, at a 5/min rate. After 12 hours more at this temperature and under helium flowing, the temperature was raised to 1390° C. at a 10° C./min rate, still under helium flowing. The temperature was kept at 1390° C. for 10 minutes and then decreased to 800° C., at a 10° C./min rate, when the oven was shut off and cooled to room temperature, still under nitrogen atmosphere.

The resulting samples were two glassy bodies having no crackings and a cylindrical shape.

The invention claimed is:

1. Process for the production of glassy articles comprising the following operations:
   a) preparation of an aqueous or hydroalcoholic solution, or suspension, of at least a compound having the formula $$X_m\text{—}M\text{—}(OR)_{n-m}$$

wherein M is a cation of an element belonging to the $3^{rd}$, $4^{th}$, or $5^{th}$ Group of the Periodic System, n means the cation valence, X is $R_1$ or $OR_1$, $R_1$ being the same or different from R, m is zero or an integer number lower than 3, R and $R_1$ are hydrocarbon radical having a carbon atom number up to 12;
   b) hydrolysis of the above said compound, either in solution or in suspension, to obtain a sol;
   c) eventual addition in colloidal suspension of possible $M_2O_n$
   d) sol gelling;
   e) substitution of gel pore solvent with a non protic solvent;
   f) gel setting in a pressure chamber;
   g) inert gas fluxing into the pressure chamber;
   h) pressure chamber heating over a programmed time period to achieve predeterminate temperature and pressure values, lower than the relevant critical value of the gel solvent, and evaporation thereof;
   i) depressurization of the pressure chamber with vapor discharge;
   j) pressure chamber washing by an inert gas;
   k) cooling dried gel and removal thereof from the pressure chamber;
   l) dried gel syntherization by heating at a prefixed temperature to form a glassy body without any cracking.

2. Process for the production of glassy articles according to claim 1 in which precursor in the step a) is a silicon alkoxide.

3. Process for the production of glassy articles according to claim 1 in which, in the presence of the step c), the sol is added by a mixture comprising fumed or colloidal silica.

4. Process for the production of glassy articles according to claim 1 in which, the gelling according to the step d), is carried out at a temperature lower than 90° C.

5. Process for the production of glassy articles according to claim 1 in which the gel solvent is substituted by a non protic solvent, selected among acetone, dioxane, hydrofuran.

6. Process for the production of glassy articles according to claim 5 in which the solvent replacing the gel solvent is acetone.

7. Process for the production of glassy articles according to claim 1 in which, according to step g), the inert gas is fluxed at a pressure suitable to achieve, at the pressure chamber temperature lower than the gel solvent critical temperature, a total pressure lower than the gel solvent critical pressure, from total pressure values close to the critical pressure values up to the deviations of about 60%.

8. Process for the production of glassy articles according to claim 7 in which the inert gas is nitrogen.

9. Process for the production of glassy articles according to claim 1 in which the operations according to the step l), is carried out at temperatures ranging from 900° C. to 1800° C.

10. Process for the preparation of a sol comprising the following operations:
- a) preparation of an aqueous or hydroalcoholic solution, or suspension, of at least a compound having the formula

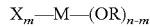

wherein M is a cation of an element belonging to the $3^{rd}$, $4^{th}$, or $5^{th}$ Group of the Periodic System, n means the cation valence, X is $R_1$ or $OR_1$, $R_1$ being the same or different from R, m is zero or an integer number lower than 3, R and $R_1$ are a hydrocarbon radical having a carbon atom number up to 12;
- b) hydrolysis of the above said compound, either in solution or in suspension, to obtain a sol;
- c) eventual addition in colloidal suspension of possible $M_2O_n$.

11. Process for the preparation of a gel comprising the following operations:
- c) eventual addition in colloidal suspension of possible $M_2O_n$
- d) sol gelling;
- e) substitution of gel pore solvent with a non protic solvent;
- f) gel setting in a pressure chamber;
- g) inert gas fluxing into the pressure chamber;
- h) pressure chamber heating over a programmed time period to achieve predeterminate temperature and pressure values, lower than the relevant critical value of the gel solvent, and evaporation thereof;
- i) depressurization of the pressure chamber with vapor discharge;
- j) pressure chamber washing by an inert gas;
- k) cooling dried gel and removal thereof from the pressure chamber.

12. Process for the preparation of a gel according to claim 11 in which according to step g), the inert gas is fluxed at a pressure suitable to achieve, at the pressure chamber temperature lower than the gel solvent critical temperature, a total pressure lower than the gel solvent critical pressure, from total pressure values close to the critical pressure values up to the deviations of about 60%.

13. Process for the production of glassy articles according to claim 12 in which the inert gas is nitrogen.

* * * * *